3,117,984
ALKYLTITANIUM HALIDES

Claus Beermann, Roderich Graf, and Herbert Bestian, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 11, 1956, Ser. No. 627,545
Claims priority, application Germany Dec. 16, 1955
6 Claims. (Cl. 260—429.5)

This invention relates to organometallic compounds of titanium and to the method of their preparation and purification. More particularly it relates to alkyltitanium halides.

In accordance with the present invention it has been found that alkyltitanium halides are produced by contacting a tetravalent titanium halide with a molecular portion of a metalloalkyl compound of one of the metals Li, Mg, Zn, Cd, Al and Pb.

Now we have found that aliphatic organotitanium derivatives of the general formulae

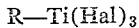

and

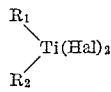

wherein R, $R_1$ or $R_2$ represent the same or different aliphatic hydrocarbon radicals having 1 to 18 carbon atoms, preferably up to 4 carbon atoms and Hal represents fluorine, chlorine, bromine and/or iodine can be produced by reacting titanium halides of tetravalent titanium with at least one organometallic compound of at least one of the metals lithium, magnesium, zinc, lead and aluminum. The dialkyltitanium dihalides can also be prepared by reacting monoalkyltitanium trihalides with the organometallic compounds mentioned whereby the latter may also be used in the form of their crude products obtained when preparing them.

Dialkyltitanium dihalides are less stable at temperatures above 0° C. than are monoalkyltitanium trihalides and this must be considered in selecting reaction conditions.

The alkyl groups in the reagents and products of this invention may have 1 to about 18 carbon atoms but preferably are methyl, ethyl, propyl, isopropyl, butyl or isobutyl for ease of purification and for use as a catalyst. In the case of dialkyltitanium dihalides the alkyl groups may be the same or different.

The halogens may be fluorine, chlorine, bromine or iodine, and more desirably bromine and chlorine. Chlorine is the preferred halogen in the reagents and products of the invention.

The reaction can be carried out by combining the titanium tetrahalides with the organometallics mentioned, suitably in solution, in any inert solvent, boiling, e.g. in the range from —20° to +250° C. or even higher, such as hexane, heptane, octane, cyclohexane, cyclopentane, their alkyl derivatives, such as methylcyclohexane, or gasoline fractions containing the aforementioned or higher aliphatic hydrocarbons, for example, Sinarol, that is, a mixture boiling between 180 and 230° C. or fractions of the Fischer-Tropsch synthesis, or in aromatic hydrocarbons, for example, benzene, toluene, xylene or chlorobenzene, i.e. substances which are liquid at reaction temperature or such halogenated hydrocarbons as methylene chloride. In general, the reaction is carried out in the absence of air, suitably under nitrogen, or any other inert gas under anhydrous conditions. In case no completely alkylated aluminum compounds are used as starting material it is advantageous to use carbon dioxide as inert gas.

In the preparation of monoalkyltitanium trihalides, it is often advisable to use an excess of titanium halides of tetravalent titanium. The alkylating organometallic compound is added dropwise, with vigorous agitation, to the titanium halide or its solution so as to maintain an excess of the titanium halide.

The temperature of the reaction is dependent upon the particular reagents used in the reaction, but as low a temperature is used as is effective for bringing about reaction but not so high as to cause decomposition of the alkyltitanium halide. Monoalkyltitanium halides are more stable than dialkyltitanium halides in that they may be heated for a longer period at elevated temperatures. Thus, while the reaction between the titanium halide (alkyltitanium trihalide or titanium tetrahalide) and the alkyl compound of the other metals set forth above may be carried out at temperatures as high as 150° C., this temperature is not maintained long enough to allow complete decomposition of the product. In most cases reaction is readily effected at below 60° C. and it is desirable to use as low a temperature as will effect reaction without appreciable decomposition of the desired product.

When alkylzincs or alkylcadmium compounds are used as alkylating agents for the preparation of monoalkyltitanium trihalides, brief heating of the reaction mixture to a maximum of 150° C., preferably 30–60° C., is advisable to complete the conversion. The operation can be carried out under pressure and/or under reflux, depending on the type of solvent used.

The monoalkyltitanium halides can be separated from the metal halides of lithium, magnesium, zinc and cadmium by sublimation, preferably in vacuo. The monoalkyltitanium halides can be separated also by dissolving them in an inert solvent, for example, in any of the aforementioned types. The insoluble metallic salts of the other metal can be removed by filtration.

A preferred method of separating the alkyltitanium halides from reaction mixtures containing organoaluminum or lead compounds consists in adding a complex former which forms insoluble or nonvolatile complexes with the resulting aluminum and lead compounds. Suitable complex formers are finely divided metallic halides (soluble in polar solvents) of the first and second group of the Periodic Table. Exemplary halides are potassium chloride, potassium bromide, calcium chloride or bromide, sodium chloride, or bromide, or compounds having odd electron pairs, for example, higher ethers, such as diisoamyl ether, dihexyl ether, diphenyl ether, dichloro-diphenyl ether, triphenyl phosphine. These compounds can be suitably added to the reactants before blending. The alkyltitanium halides can be obtained in pure form by sublimation or they can be separated from the insoluble complexes by filtration.

The alkyltitanium halides can also be freed of excess titanium halide by recrystallization from inert solvents, for example, those mentioned above.

According to this invention solid or liquid methyltitanium trihalides can be prepared by mixing, suitably in the presence of a solvent, methylaluminum dihalides, dimethylaluminum halides, trimethylaluminum, or mixtures of these compounds and titanium tetrahalides. It is recommended to vacuum sublime the reaction mixture obtained in accordance with the invention, the application of a good vacuum is especially suitable when the starting materials are not sufficiently pure. The distillate obtained in this manner melts at about room temperature to form a brownish liquid which contains, for example, methyltitanium trichloride and monomethylaluminum dichloride if dimethylaluminum chloride and titanium tetrachloride have been used as starting components.

The brown liquid can further be purified by adding an excess of finely powdered sodium chloride whereupon the aluminum compound probably forms a complex with the sodium chloride. The purification may best be accomplished when the mixture is heated, with agitation, for approximately 3 to 10 minutes at about 40° C. The temperature and the time depend on the fineness of the sodium chloride crystals used. It is not recommended to increase the temperature much above 50° C. The methyltitanium trichloride compound is sublimed from the mixture thus obtained by repeated vacuum sublimation. The alkyltitanium chloride, e.g. methyltitanium trichloride separates in the receiver cooled to a low temperature as coarse deep violet crystals which melt at about room temperature.

The product obtained still contains a negligible trace of aluminum compounds, which, if necessary, can be removed by dissolving the product in hexane and adding a small amount of a complex former such as diphenyl ether or a similar compound. The complex former probably lowers the vapor pressure of the organoaluminum compound; thus, a methyltitanium trichloride which is practically free of aluminum is obtained in subsequent sublimation in high vacuum at 0° C. Methyltitanium bromide is similarly prepared.

It is advisable to maintain the pure crystals of the alkyltitanium halides at low temperatures suitably below 0° C., advantageously between —50 and —80° C. to avoid decomposition.

The compounds prepared according to the invention represent in the solid state violet to black substances which are sensitive to air, water, light, heat and halogen and which dissolve in aliphatic and aromatic hydrocarbons and chlorinated hydrocarbons with the formation of a yellow solution. They may be used, for example as catalysts in the polymerization of olefins and/or intermediates for example in the preparation of other organometallic compounds.

EXAMPLE 1

Methyltitanium Trichloride

Twenty mmoles of titanium tetrachloride and 20 mmoles of dimethylaluminum chloride were mixed at room temperature. The mixture was allowed to stand for about an hour at room temperature and then sublimed at room temperature at 2 mm. Hg into a receiver cooled to a low temperature (—80° C.). The distillate was heated until it melted into a brown liquid. Ten grams of finely powdered dry sodium chloride was added in portions with some agitation in the beginning. This was accompanied by slight evolution of heat. Care must be taken that the temperature at the introduction of the sodium chloride does not appreciably exceed 40–50° C.; this may be accomplished by cooling. The reaction with sodium chloride is then completed by vigorous agitation of the total reaction mixture for about 5 min. at 40° C.

A practically pure methyltitanium trichloride $$(CH_3TiCl_3)$$

may be sublimed from the mixture under the same conditions. The last trace of the organoaluminum compound was removed by adding 0.1 cu. cm. of benzyl or diphenyl ether to a solution, cooled to —70° C., of the crude product in 15 cu. cm. of hexane, and then heating to room temperature and subliming again.

EXAMPLE 2

Ethyltitanium Trichloride 22.5 mmoles of titanium tetrachloride in 7.5 cc. of hexane was mixed with 20 mmoles of diethylaluminum chloride in 10 cc. of hexane at —80° C. After the addition of 15 g. of fine table salt, while agitating, the mixture was gradually heated to 0° C. Hexane and then ethyltitanium trichloride were distilled at 1 mm. Hg. Deep violet crystals separated in the trap cooled at —80° C.; the crystals were soluble in hexane. The compound can be freed of excess titanium tetrachloride by recrystallization from hexane at —80° C.

EXAMPLE 3

Isobutyltitanium Trichloride

To 22.5 mmoles of titanium tetrachloride in 7.5 cc. of hexane was slowly added, at —80° C., a mixture of 20 mmoles of diisobutylaluminum chloride and 22.5 mmoles of phenyl ether. After the mixture was heated to room temperature, the solvent and then the isobutyltitanium trichloride were distilled at 1 mm. Hg. The compounds separated as a yellow solution in the trap cooled at —80° C. On prolonged standing at —80° C., the solution solidifies to a deep violet mass.

EXAMPLE 4

Isobutyltitanium Trichloride

When the diisobutylaluminum chloride is replaced with 10 mmoles of triisobutylaluminum and 11 mmoles of diphenyl ether, other conditions remaining the same as in Example 3, the compound obtained is the same in composition and yield as in that example.

EXAMPLE 5

Methyltitanium Bromide

Twenty mmoles of titanium tetrabromide was dissolved in 15 cc. of toluene. To this was added a solution of 10 mmoles of dimethylzinc. The mixture was heated for 25 minutes at 50–60° C. with vigorous agitation. The toluene with some of the methyltitanium tribromide and then the methyltitanium tribromide were distilled at 1 mm. Hg. At room temperature, the resulting dark violet crystals melted to form a yellow solution.

EXAMPLE 6

Dimethyltitanium Dichloride

To 10 mmoles of titanium tetrachloride in hexane was slowly added a solution of 20 mmoles of trimethylaluminum in hexane at —80° C. The solution was heated to room temperature for a few minutes; after the solution was cooled again to —80° C., black crystals of dimethyltitanium dichloride precipitated. The compound was filtered and purified by recrystallization from hexane, if necessary, by means of distillation.

EXAMPLE 7

Dimethyltitanium Dichloride

The reaction of Example 6 can be carried out with monomethyltitanium trichloride with more complete utilization of the alkyl bound to the aluminum.

EXAMPLE 8

Methyltitanium Trichloride

To a solution of 10 mmoles of monomethylaluminum dichloride in 10 cc. of hexane there were added 10 mmoles of titanium tetrachloride. After the addition of 1.5 cc. of diphenyl ether the mixture was heated to the boil and it was maintained at this temperature for 5 minutes. The mixture was then cooled and the hexane and the methyltitanium chloride sublimed at finally 0.5 mm. Hg into a receiver cooled to —80° C. The methyltitanium trichloride separated in the receiver in the form of dark violet crystals which formed a yellow solution in hexane when heated to room temperature. The hexane solution contained 5.8 mmoles of methyltitanium trichloride and traces of aluminum compounds which could be removed by means of a repeated distillation while adding a little diphenyl ether.

EXAMPLE 9

Methyltitanium Trichloride

To a solution of 20 mmoles of titanium tetrachloride in 5 cc. of hexane a solution of 10 mmoles of trimethylaluminum was added dropwise. After the addition of 10 g. of finely powdered dry sodium chloride the mixture was agitated for 15 minutes at room temperature and the hexane and the methyltitanium trichloride were then distilled off as described in Example 8.

The distillate contained 14.6 mmoles of methyltitanium trichloride and a little methylaluminum dichloride. It could be freed of these impurities by a repeated distillation in the presence of a little diphenyl ether.

What is claimed is:

1. A compound of the formula $R_xTiHal_y$ wherein Hal is halogen, R is an alkyl of 1 to 18 carbon atoms, $x$ is an integer from 1 to 2, $y$ is an integer from 2 to 3 and the sum of $x$ and $y$ is 4.
2. Monoalkyltitanium trichloride wherein the alkyl radical contains from 1 to 18 carbon atoms.
3. Methyltitanium trichloride.
4. Ethyltitanium trichloride.
5. Isobutyltitanium trichloride.
6. Dimethyltitanium dichloride.

References Cited in the file of this patent

UNITED STATES PATENTS 2,739,165  Plueddemann _____ Mar. 20, 1956

FOREIGN PATENTS 534,792  Belgium _____ Jan. 31, 1955

OTHER REFERENCES

Herman et al.: J.A.C.S., 75, 3882–3887 (1953).
Gilman et al.: J. Org. Chem., 10, N. 6, 505–515 (1945).
Gilman et al.: J.A.C.S., 76, 3615–17, July 30, 1954.
Gilman et al.: "J. Org. Chem.," vol. 10, No. 6, pp. 505–515 (1945).
Gilman et al.: "Journal of the American Chemical Society," vol. 76, No. 14, pp. 3615–3617, July 20, 1954.